Oct. 10, 1967  F. R. SMITH  3,345,803
METHOD AND APPARATUS FOR DEGASSING VISCOSE
Filed Jan. 7, 1965
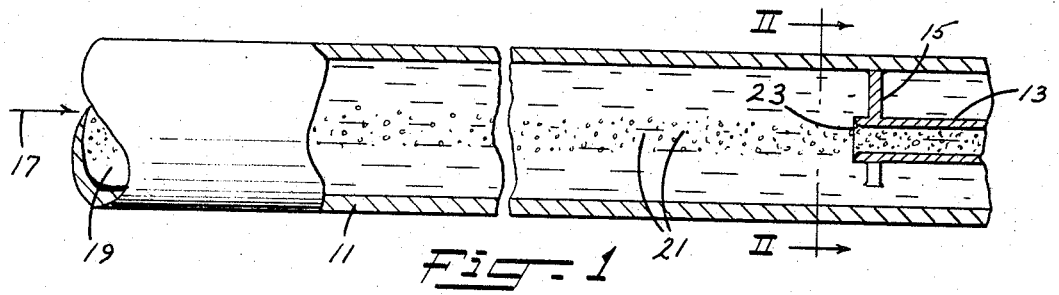
Fig. 1
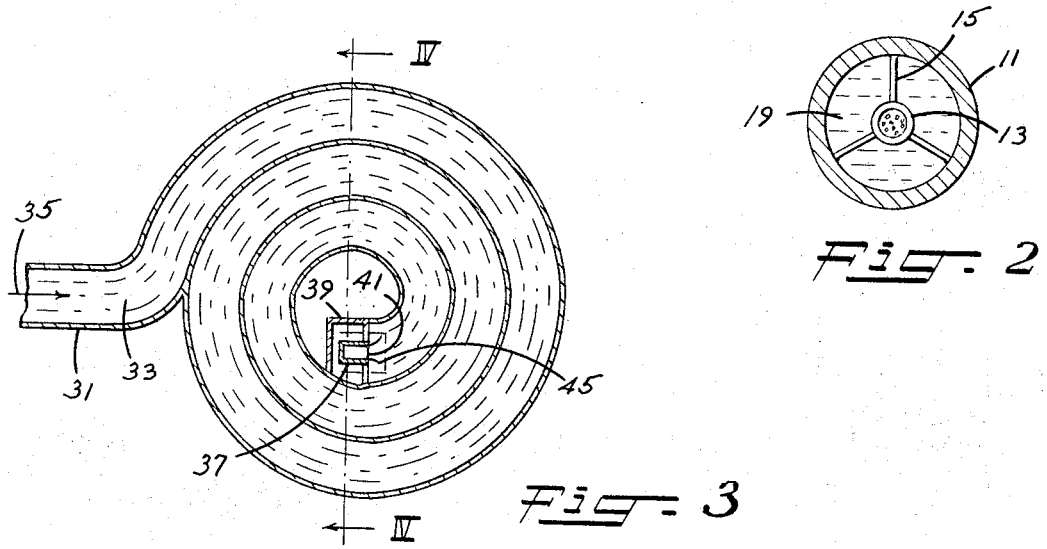
Fig. 2
Fig. 3
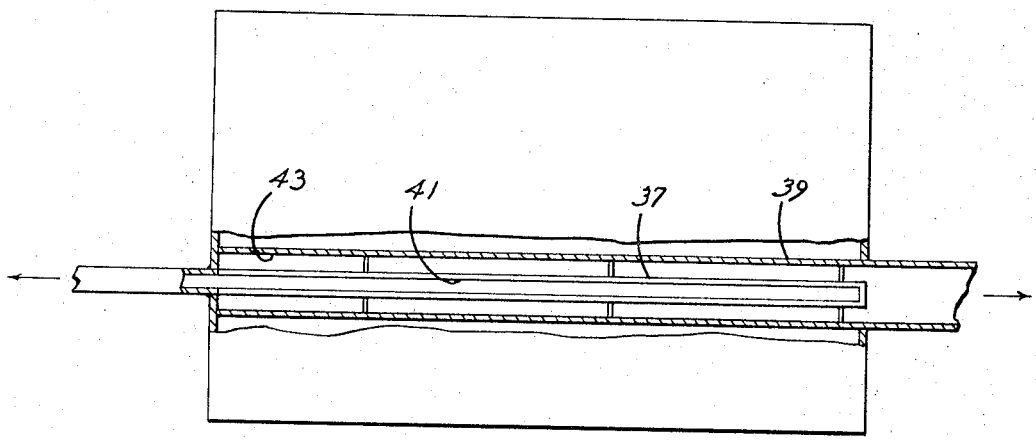
Fig. 4

United States Patent Office 3,345,803
Patented Oct. 10, 1967

3,345,803
METHOD AND APPARATUS FOR DEGASSING VISCOSE
Frederick R. Smith, Wilmington, Del., assignor to FMC Corporation, Philadelphia, Pa., a corporation of Delaware
Filed Jan. 7, 1965, Ser. No. 423,947
4 Claims. (Cl. 55—55)

ABSTRACT OF THE DISCLOSURE

Method and apparatus for degassing a viscous liquid by establishing a laminar flow of such liquid within a conduit, whereby the shear gradient imposed upon the liquid causes entrained gas bubbles to migrate toward the center of such flow from which they are subsequently separated through a pipe disposed coaxially of the conduit.

---

This invention relates to the removal of air and other gases from viscous liquids, and more particularly to a method and apparatus for degassing viscose.

In the manufacture of shaped regenerated cellulose products, a shaped stream of viscose is extruded into an acid-sulfate bath where it is coagulated and regenerated to provide the desired product. The viscose itself is prepared by mixing aged alkali cellulose crumbs with carbon disulfide until the alkali cellulose is xanthated. This cellulose xanthate in crumb form is then mixed with dilute aqueous sodium hydroxide solution, the amount and concentration of which being such as to provide a viscose containing from 4% to 15% cellulose and from 4% to 10% caustic in the final mixture. During and/or after the ripening stage the viscose is deaerated to remove air and other gases which are dissolved or otherwise entrained therein.

The gases within the viscose are generally present therein in the form of bubbles which, if permitted to remain, would cause extrusion problems and would provide inferior products. For example, in the manufacture of artificial filaments, employing an incompletely degassed viscose would result in broken filaments, possible plugging of extrusion orifices and non-uniform and thus inferior yarns.

Various degassing or deaeration methods have been proposed and employed. One known method involves subjecting a batch of viscose to vacuum, sometimes accompanied by agitation or mixing, to cause entrained gas bubbles to rise to the surface of the viscose and then be removed. A similar procedure involves the use of baffles, plates or cones for spreading the viscose as a thin layer or film. By this method, the entrained gases have only a short distance to travel to reach the surface of the film of viscose so that a generally more rapid degassification of the viscose is possible. However, none of these conventional procedures are completely satisfactory since they generally require a large, expensive and sometimes complicated apparatus which must be frequently taken out of service for cleaning. Accordingly, a primary object of this invention is to provide a generally new or improved and more satisfactory method and apparatus for degassing viscose.

Another object of this invention is the provision of an improved method and apparatus for removing gases from viscose without subjecting the same to a vacuum.

Still another object is the provision of an improved method and apparatus for continuously removing gases from viscose while it is in motion.

These objects are accomplished in accordance with the present invention by a method and apparatus in which a laminar flow of viscose containing gas bubbles is established along a confined path whereby a shear gradient is imposed upon the viscose between the central and outermost portions thereof. This shear gradient causes bubbles og gas to migrate inward from the regions of high shear stress concomitantly as the viscose flows along the confined path. As the laminar flow of viscose continues along this confined path for a sufficient distance the gas bubbles accumulate along the central portion of the viscose flow from which they are easily separated.

The apparatus for practicing the method of the present invention includes an elongated conduit having an inlet at one end through which is introduced a laminar flow of viscose containing gas bubbles. As mentioned above, as the viscose flows through the conduit, the contained gas bubbles move from the regions of high shear stress along the conduit wall. A pipe projects into and is supported substantially centrally of the opposite or exit end of the conduit for separating the central portion of the viscose flow from the remainder thereof which has been degassed.

The conduit of the above described apparatus may be of cylindrical shape. Alternatively, the conduit may be flat and relatively wide so as to expose as much viscose as possible to a high shear stress which developes along the internal surfaces of the conduit walls. In this instance, the flat conduit is preferably wound upon itself in a spiral form for compactness. The length of the conduit required for use in the described method of the present invention will depend upon such factors as the viscosity and/or flow rate of liquid which is being degassed, the degree of the degassification which is desired, the size and character of the wall surface of the conduit which is employed, etc.

The method of the present invention may be used alone or in combination with conventional degassing procedures. For example, the portion of the viscose which is at least partially degassed by the method of the present invention could be processed further in the same or a similar apparatus or could be further treated in a conventional film deaerator. The central portion of the viscose flow which contains all or the major portion of gas bubbles which were originally entrained within the viscose could be recirculated through the described apparatus or could be further treated with a conventional deaerating device before being recirculated.

It will be noted that with the method and apparatus of the present invention deaeration of the viscose can be effected continuously and while the viscose is in transit, thus requiring only a minimum of equipment. In view of the absence of stagnant or low flow areas gel formations can be, of course, avoided so that the "down-time" of the apparatus for cleaning is minimized. Moreover, since the method of the present invention is carried out at atmospheric pressure, foaming of the viscose can be easily controlled.

The above described method lends itself well for use with liquids which are of extremely high viscosity and can be employed alone or in combination with other degassing procedures. For example, the method of the present invention may be amployed to remove a major portion of the gas bubbles from the viscose after which such viscose may be treated in a conventional film deaerator. When treating partially deaerated viscose, the film deaerator could, of course, handle a much larger capacity without any significant sacrifice or fluctuation in the degree of vacuum to which such viscose is subjected.

For a more complete understanding of the method and apparatus of the present invention reference is made to the accompanying drawing in which FIGURE 1 is a side view of one embodiment of the apparatus of the present invention, with a portion thereof being shown in section;

FIGURE 2 is a vertical section taken transversely through the apparatus shown in FIGURE 1 substantially along the lines II—II;

FIGURE 3 is an end view of a second embodiment of the apparatus; and

FIGURE 4 is a partial section as taken generally along the lines IV—IV of FIGURE 3.

Basically, the apparatus shown in FIGURE 1 and 2 of the drawing shows a conduit 11 and a pipe 13 which is supported substantially centrally of the conduit 11 by an open frame 15. As indicated by arrow 17 a laminar flow of viscose 19 is caused to travel continuously into and through the conduit 11 whereby a shear gradient is imposed upon the viscose between the central and outermost portions thereof. This shear gradient causes the contained bubbles of gas, as indicated at 21, to migrate inward from the regions of a high shear stress which develop along the inside surfaces of the conduit wall.

The pipe 13 projects into the conduit 11 from its exit or discharge end and is designed to receive the central portion of the viscose flow and the gas bubbles which have accumulated therein. It will be noted that the entrance 23 of the pipe 13 is flared as by feathering the edge thereof so that the central portion of the viscose flow is separated from the remainder thereof with little or no turbulence so as to minimize the possibility of again dispersing the gas bubbles. The portion of the viscose which travels into the pipe 13 may be recirculated through the same or a similar apparatus or may be treated in a conventional deaerator before being recirculated.

The portion of the viscose which flows beyond the entrance end of the pipe 13 is, of course, degassed and may be collected as it issues from the conduit 11. The degree to which this portion of the viscose is degassed will depend upon such factors as the length and cross-sectional size of the conduit, the character of the inside surface of the conduit, etc. and thus can be varied to suit the specific conditions.

Turning to FIGURES 3 and 4 of the drawing the embodiment of the apparatus there illustrated includes a flat conduit 31 which is wound spirally upon itself for compactness. A laminar flow of viscose 33 which is to be degassed is introduced at one end of the conduit 31 as indicated by arrow 35 and travels the spiral path of the conduit until it is discharged through pipes 37 and 39.

During this movement of the viscose through the conduit 31 the contained gas bubbles migrate away from the regions of high shear stress which develop on the surfaces of the conduit walls and accumulate within the central portion of the viscose flow. Thus, after the viscose flow approaches the discharge end of the conduit 31 the central portion thereof, which contains substantially all or a major portion of the gas bubbles, passes through an elongated slot 41 in the pipe 37. The remainder of such flow, namely the outer portions thereof which has been degassed, travels through elongated slot 43 and into the conduit 39 from which it may be passed to a suitable collection chamber.

It will be noted that the entrance to the pipe 37 is flared at 45 to receive the central portion of the viscose flow with a minimum of turbulence. As with the previously described embodiment of the apparatus, the portion of the viscose flow which passes into the pipe 37 may be recirculated in the same or a similar apparatus or may be treated in a conventional deaerator and be recirculated.

In the operation of both of the described embodiments of the apparatus, during the degassification procedure the viscose remains in continuous motion so that stagnant areas or areas of extremely low flow are avoided. As a result, the viscose has no tendency to gel and thus "downtime" of the apparatus for cleaning is avoided or at least minimized. Moreover, since the degassification of the viscose is achieved without the use of a vacuum or any intended agitation the problems of viscose foaming and/or reintroduction of gas bubbles are not present. While both of the described embodiments are designed to accomplish the same end result, the apparatus shown in FIGURES 3 and 4 serves to expose a larger proportion of the viscose to the high shear stresses which develops along the internal surface of the conduit walls and is therefore capable of achieving the desired degassification of the viscose at a somewhat more rapid rate.

The following examples are given to further illustrate the method of the present invention, it being understood that the details set forth in these examples are not to be considered restricting the invention thereto.

*Example I*

A laminar flow of viscose from a mixer was passed through a straight 10 foot length of ½ inch steel tubing at a rate of 75 grams per minute. At the discharge end of the tubing, the central portion of this viscose flow, containing about one-half of the volume, was separated from the remainder thereof from which were removed over 90% of the gas bubbles.

*Example II*

A flat rectangular steel conduit 25 inches wide and ½ inch deep was wound spirally upon itself as shown in FIGURES 3 and 4 of the drawing. The length of the spiral path was about 25 ft. and terminated in a means for separating the central portion of the viscose flow from the remainder thereof. A laminar flow of viscose from a mixer was passed through this apparatus at the rate of 5000 grams per minute. This portion of the viscose which was deaerated in accordance with the described process constituted about one-half of the viscose flow and was found to be at least 90% free of gas bubbles.

It is understood that changes and variations may be made without departing from the spirit and scope of the present invention as defined in the appended claims.

I claim:

1. A method of degassing a viscous liquid which includes the steps of establishing along a confined path a laminar flow of a viscous liquid having bubbles of gas contained therein so that a shear gradient is imposed upon such liquid between the central and outermost portions thereof, to cause bubbles of contained gas in the outermost portion to migrate toward the central portion of the liquid flow concomitantly as the liquid travels along the confined path, separating the outermost portion of the liquid flow from the remainder thereof and collecting the separated portion of the liquid.

2. A method of degassing viscose which includes the steps of feeding a stream of viscose containing gas bubbles into and through a conduit as a laminar flow to cause the contained gas bubbles to move inward away from the regions of high shear stress along the conduit wall, maintaining the laminar flow of viscose through the conduit until at least a portion of the contained bubbles of gas accumulate along the central section of the conduit, and separately collecting the outermost portions of the stream of viscose from the remainder thereof with a minimum of turbulence.

3. A method as defined in claim 2 wherein said stream of viscose is directed along a spiral path during the degassing thereof.

4. Apparatus for degassing a viscous liquid including an elongated conduit having a rectangular cross-section and wound upon itself into a spiral form and being of substantially uniform cross-section throughout its length, said conduit being open at its opposite ends, one of said ends serving as an inlet for receiving a laminar flow of viscous liquid containing gas bubbles whereby the contained gas bubbles move inward away from the regions of high shear stress along the conduit wall concomitantly as the liquid travels through said conduit, the other end of said conduit serving as an exit through which degassed liquid is discharged, a pipe of smaller cross-section than said conduit, said pipe having an entrance located at least adjacent to the exit end of said conduit, and means supporting at least the entrance end of said pipe in co-axial relationship with said conduit whereby the central portion of the viscous liquid flow is separated from the remainder as it approaches the exit end of said conduit.

References Cited

UNITED STATES PATENTS

| | | | |
|---|---|---|---|
| 1,083,740 | 1/1914 | Hodges | 55—170 |
| 1,095,463 | 5/1914 | Kieser | 55—169 |
| 2,509,267 | 5/1950 | Goodwin | 55—55 |
| 2,713,919 | 7/1955 | Walker et al. | 55—174 |
| 2,813,833 | 11/1957 | Revallier | 55—205 |
| 2,868,312 | 1/1959 | Erwin | 55—174 |

FOREIGN PATENTS

| | | |
|---|---|---|
| 452,265 | 10/1927 | Germany. |
| 526,137 | 5/1955 | Italy. |

REUBEN FRIEDMAN, *Primary Examiner.*

C. N. HART, *Assistant Examiner.*